US012695469B2

(12) United States Patent
Choi et al.

(10) Patent No.: US 12,695,469 B2
(45) Date of Patent: Jul. 28, 2026

(54) COMMUNICATION DEVICE AND WIRELESS COMMUNICATION METHOD

(71) Applicant: Samsung Electronics Co., Ltd., Suwon-si (KR)

(72) Inventors: Ilmuk Choi, Suwon-si (KR); Kiho Kil, Suwon-si (KR); Kyunghyun Paik, Suwon-si (KR); Jeounggil Lee, Suwon-si (KR); Wonseok Jeong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 188 days.

(21) Appl. No.: 18/517,874

(22) Filed: Nov. 22, 2023

(65) Prior Publication Data
US 2024/0178865 A1 May 30, 2024

(30) Foreign Application Priority Data
Nov. 25, 2022 (KR) ........................ 10-2022-0159952

(51) Int. Cl.
*H04B 1/00* (2006.01)

(52) U.S. Cl.
CPC ......... *H04B 1/0057* (2013.01); *H04B 1/0003* (2013.01)

(58) Field of Classification Search
CPC .... H04B 1/0053; H04B 1/0057; H04B 1/006; H04B 1/0064
See application file for complete search history.

(56) References Cited

U.S. PATENT DOCUMENTS

| | | | |
|---|---|---|---|
| 9,204,434 | B2 | 12/2015 | Chen et al. |
| 9,300,451 | B2 | 3/2016 | Papasakellariou et al. |
| 9,680,619 | B2 | 6/2017 | Ro et al. |
| 10,454,550 | B2 | 10/2019 | Bai |
| 10,547,426 | B2 | 1/2020 | Papasakellariou |
| 10,588,141 | B2 | 3/2020 | Rico Alvarino et al. |
| 10,681,743 | B2 | 6/2020 | Yoon et al. |
| 10,693,610 | B2 | 6/2020 | Liu et al. |
| 11,381,365 | B2 | 7/2022 | Liu et al. |
| 11,601,186 | B1 * | 3/2023 | Ramasamy .......... H04B 7/0808 |
| 2014/0376417 | A1 * | 12/2014 | Khlat ...................... H04L 5/001 |
| | | | 370/277 |

(Continued)

FOREIGN PATENT DOCUMENTS

| | | |
|---|---|---|
| KR | 10-2015-0132368 A | 11/2015 |
| KR | 10-2018-0116310 A | 10/2018 |

*Primary Examiner* — Wen W Huang

(74) *Attorney, Agent, or Firm* — Harness, Dickey & Pierce, P.L.C.

(57) ABSTRACT

A communication device includes a first antenna and a second antenna, a first front-end module configured to provide a transmission path associated with a first network or a first reception path associated with the first network, and a diplexer electrically configured to provide a second reception path associated with the first network and a first reception path associated with a second network, and processing circuitry configured to electrically connect the first front-end module to the first antenna in a first state, electrically connect the diplexer to the second antenna in the first state, electrically connect the first front-end module to the second antenna in a second state, and electrically disconnect the diplexer from the second antenna in the second state.

20 Claims, 19 Drawing Sheets

(56) References Cited

U.S. PATENT DOCUMENTS

| | | | |
|---|---|---|---|
| 2017/0171856 A1* | 6/2017 | Zeng | H04L 1/0018 |
| 2019/0052328 A1 | 2/2019 | Akula et al. | |
| 2021/0058209 A1* | 2/2021 | Qin | H04L 5/0048 |
| 2021/0099205 A1* | 4/2021 | Seyed | H04B 7/0805 |
| 2021/0329508 A1* | 10/2021 | Gopal | H04L 5/0048 |
| 2022/0116172 A1* | 4/2022 | Tang | H04L 5/0007 |
| 2022/0132434 A1* | 4/2022 | Lee | H04L 5/0048 |
| 2022/0239420 A1* | 7/2022 | Kumar | H04B 7/0404 |
| 2022/0311485 A1* | 9/2022 | Gopal | H04W 8/183 |
| 2023/0083089 A1* | 3/2023 | Venkatachari | H04L 5/0048 |
| | | | 375/267 |
| 2023/0088631 A1* | 3/2023 | Kumar | H04L 5/14 |
| | | | 370/280 |
| 2023/0337229 A1* | 10/2023 | Cui | H04B 7/0602 |

* cited by examiner

| Configuration | Subframe number in a Frame | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D–Downlink
S–Special subframe
U–Uplink

FIG. 7A

D—Downlink
U—Uplink
F—Flexible

| Format | \multicolumn{14}{c}{Symbol number in a Slot} |
| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |

...

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 50 | D | D | F | F | F | U | U | D | D | F | F | F | U | U |
| 51 | D | F | F | U | U | U | U | D | F | F | U | U | U | U |
| 52 | D | F | F | F | F | F | U | D | F | F | F | F | F | U |
| 53 | D | D | F | F | F | U | U | D | D | F | F | F | U | U |
| 54 | D | D | D | F | U | D | U | D | D | D | D | D | D | D |
| 55 | F | F | F | F | F | U | U | D | F | F | F | F | D | D |
| 56~254 | \multicolumn{14}{c}{Reserved} |
| 255 | \multicolumn{14}{c}{UE determines the slot format for the slot based on tdd-UL-DL-ConfigurationCommon, or tdd-UL-DL-ConfigurationDedicated and, if any, on detected DCI formats} |

FIG. 7B

COMMUNICATION DEVICE AND WIRELESS COMMUNICATION METHOD

CROSS-REFERENCE TO RELATED APPLICATION(S)

This application claims the benefit of priority to Korean Patent Application No. 10-2022-0159952 filed on Nov. 25, 2022, in the Korean Intellectual Property Office, the disclosure of which is incorporated herein by reference in its entirety.

BACKGROUND

The present disclosure relates to a communication device and a wireless communication method.

Wireless communication devices such as mobile phones, personal digital assistants, tablets, laptop computers, and the like, may be simultaneously (or contemporaneously) connected to a plurality of networks. For example, the wireless communication device may be a multi-SIM device including two or more subscriber identity modules (SIMs), or a device for supporting dual connectivity (DC). The signal transmission/reception timings of the plurality of networks connected to the wireless communication device are independent of each other.

A communication device may transmit a sounding reference signal (SRS) that is a reference signal referenced by a base station of a network for channel estimation, through an antenna included in the communication device. A base station may perform multiple antenna signal processing or beamforming processing by estimating channels based on the reference signal transmitted from the communication device. An electronic device may improve data reception performance by receiving the multiple antenna signal processing or beamforming processed signals from the base station.

SUMMARY

An aspect of the present disclosure is to provide a communication device and a wireless communication method for receiving signals from different networks using one or more shared antennas.

An aspect of the present disclosure is to provide a communication device and a wireless communication method for enabling a shared antenna to receive a high-priority signal received from a second network without missing the signal at the timing of transmitting a reference signal for a first network through the shared antenna.

According to an aspect of the present disclosure, a communication device includes a first antenna and a second antenna, a first front-end module configured to provide a transmission path associated with a first network or a first reception path associated with the first network, and a diplexer electrically configured to provide a second reception path associated with the first network and a first reception path associated with a second network, and processing circuitry configured to electrically connect the first front-end module to the first antenna in a first state, electrically connect the diplexer to the second antenna in the first state, electrically connect the first front-end module to the second antenna in a second state, and electrically disconnect the diplexer from the second antenna in the second state.

According to an aspect of the present disclosure, a communication device includes a dedicated antenna configured to transmit or receive a signal associated with a first network, a shared antenna configured to receive the signal associated with the first network and a signal associated with a second network, and processing circuitry configured to switch between a first transmission path for transmitting a surrounding reference signal (SRS) associated with the first network and a second transmission path for transmitting the SRS, the first transmission path transmitting the SRS through the dedicated antenna, and the second transmission path transmitting the SRS through the shared antenna, and block the second transmission path when a priority of the signal associated with the second network is higher than a priority of the SRS, the signal associated with the second network to be received at a timing at which the SRS is to be output to the second transmission path.

According to an aspect of the present disclosure, a wireless communication method for contemporaneous connection to a first network and a second network includes determining a first timing when a first surrounding reference signal (SRS) associated with the first network is to be transmitted through a shared antenna, the shared antenna being configured to receive a first signal associated with the first network and a second signal associated with the second network, determining whether the first timing overlaps a second timing when the second signal is to be received, determining whether a priority of the second signal is higher than a priority of the first SRS in response to determining that the first timing overlaps the second timing, and blocking the first SRS from being transmitted at the first timing in response to determining that the priority of the second signal is higher than the priority of the first SRS.

Since a communication device according to example embodiments of the present disclosure may receive signals from different networks using one or more shared antennas, it may be connected to a plurality of networks using a reduced number of antennas. Accordingly, the communication device may be miniaturized, and manufacturing costs of the communication device may be reduced.

A communication device and a wireless communication method according to example embodiments of the present disclosure may selectively receive a signal received from a second network at a timing when a reference signal for a first network is transmitted through a shared antenna, thereby improving reception performance of the first network and the second network using the shared antenna.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

BRIEF DESCRIPTION OF DRAWINGS

The above and other aspects, features, and advantages of the present disclosure will be more clearly understood from the following detailed description, taken in conjunction with the accompanying drawings, in which:

FIGS. 7A and 7B are diagrams illustrating resource allocation of the LTE system and the 5G NR system;

DETAILED DESCRIPTION

Hereinafter, example embodiments of the present disclosure will be described with reference to the accompanying drawings.

Figure 1A:
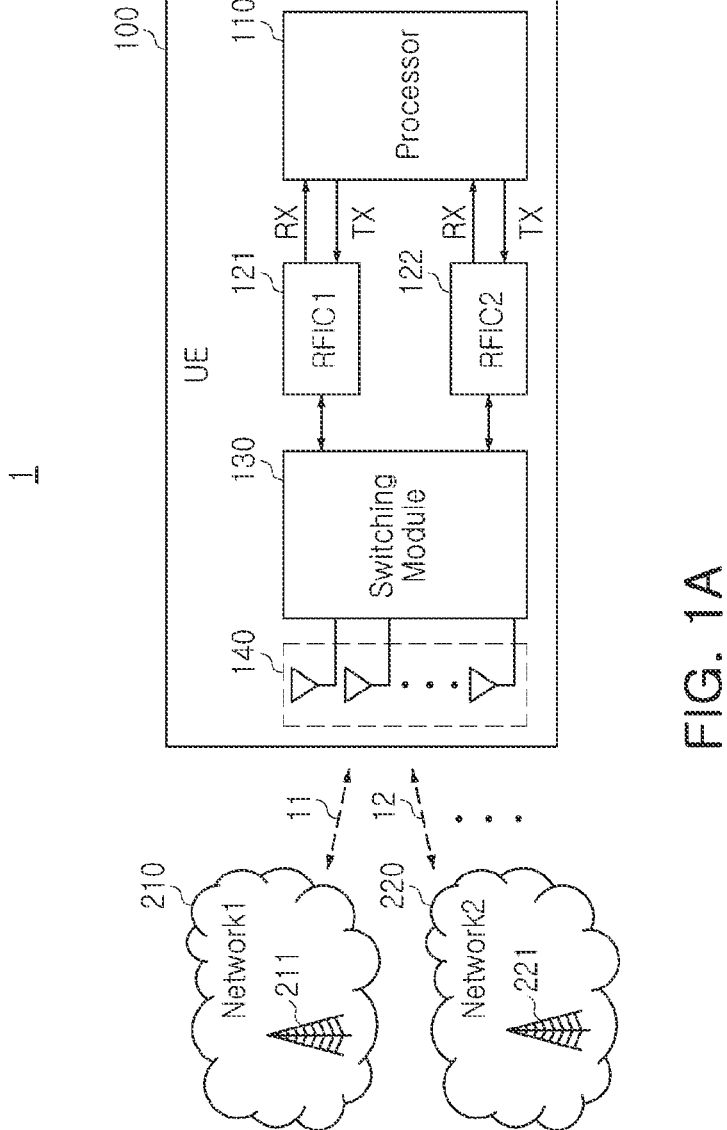
FIGS. 1A and 1B are diagrams illustrating a wireless communication system according to example embodiments of the present disclosure.
Figure 1B:
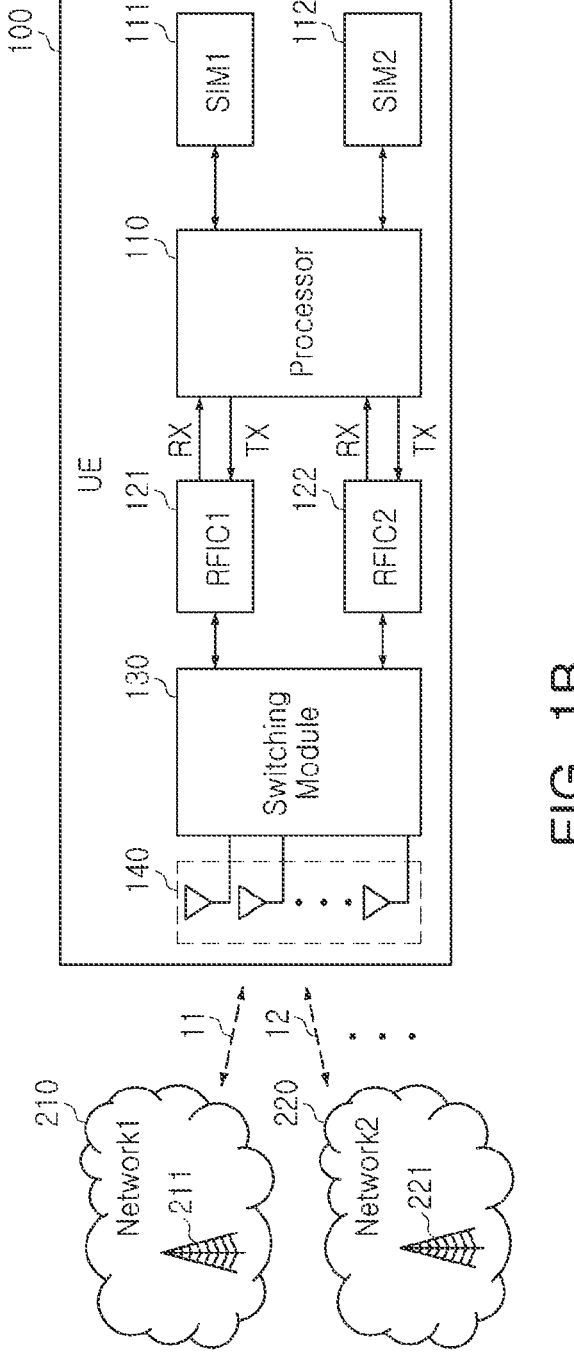
Figure 2A:
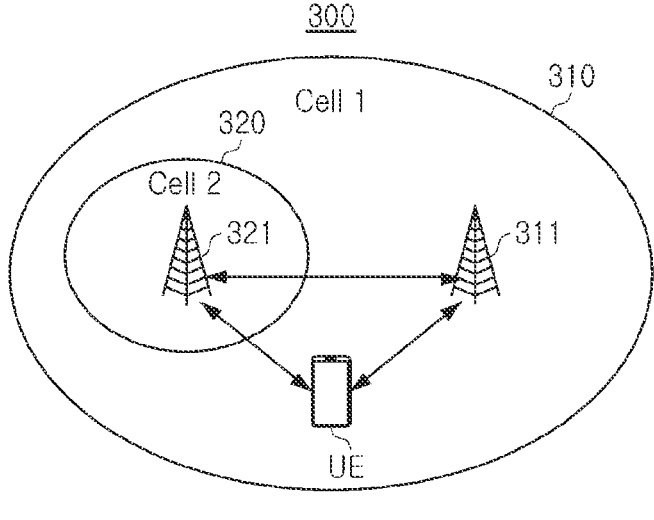
FIGS. 2A and 2B are diagrams illustrating a network environment according to example embodiments of the present disclosure.
Figure 2B:
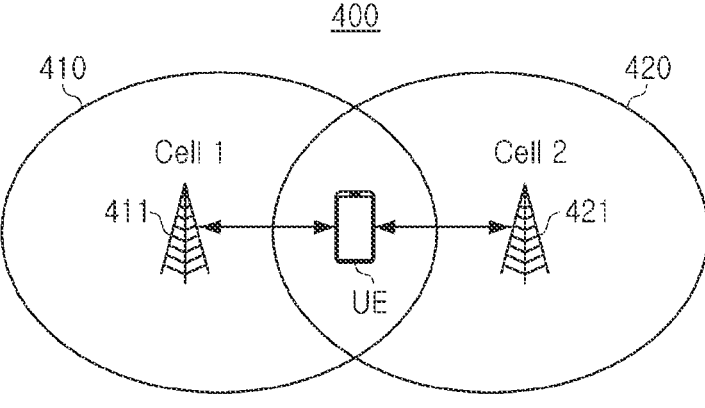

FIGS. 1A and 1B are diagrams illustrating a wireless communication system according to example embodiments of the present disclosure. In addition, FIGS. 2A and 2B are diagrams illustrating a network environment according to example embodiments of the present disclosure.

Referring to FIG. 1A, a wireless communication system 1 may include a communication device 100 (also referred to herein as the "wireless communication device 100") and a plurality of networks 210 and 220 (e.g., a first network 210 and a second network 220). The communication device 100 may refer to any device that may be fixed or mobile, and may transmit and receive data and/or control information by wirelessly communicating with the plurality of networks 210 and 220. For example, the communication device 100 may be referred to as a user equipment (UE), a terminal, terminal equipment, a terminal device, a mobile station (MS), a mobile terminal (MT), a user terminal (UT), a subscriber station (SS), a wireless device, a handheld device, etc.

Each of the plurality of networks 210 and 220 may include a base station. For example, the first network 210 may include a first base station 211, and the second network 220 may include a second base station 221. The base station may refer to a fixed station communicating with the communication device 100 and/or another base station, and the base station may exchange data and control information by communicating with the communication device and/or another base station. The base station may be referred to as Node B, evolved Node B (eNB), next generation Node B (gNB), a sector, a site, a base transceiver system (BTS), an access point (AP), a relay node, a remote radio head (RRH), a radio unit (RU), small cell, etc.

The communication device 100 may access the first network 210 through the first base station 211 and may access the second network 220 through the second base station 221. The wireless communication device 100 may communicate with the first network 210 and/or the second network 220 according to any radio access technology (RAT). For example, the communication device 100 may communicate with the first network 210 and/or the second network 220 according to a 5G New Radio (5G NR) system, a long term evolution (LTE) system, a code division multiple access (CDMA) system, a global system for mobile communications (GSM) system, a wireless local area network (WLAN) system, or any other RAT system, as a non-limiting example. The communication device 100 may communicate with the first network 210 and the second network 220 according to the same RAT (or similar RATs), or may communicate with the first network 210 and the second network 220 according to different RATs.

The communication device 100 may include a processor 110, first and second radio frequency integrated circuits (RFICs) 121 and 122 (e.g., a first RFIC 121 and a second RFIC 122), a switching module 130, and/or an antenna array 140. The antenna array 140 may receive an RF signal from the first base station 211 and the second base station 221, or transmit the RF signal to the first base station 211 and the second base station 221. The antenna array 140 may include a plurality of antennas so as to provide a diversity effect of a reception channel.

The first RFIC 121 is hardware connected to the antenna array 140 and the processor 110, and may provide a radio frequency (RF) resource for wireless communication, for example, an RF path. For example, the first RFIC 121 may be referred to as a transceiver. In FIG. 1A, a path for transmitting and receiving an RF signal associated with the first network is illustrated as a first port P1 (e.g., a first wireless communication 11), and/or a path for transmitting and receiving an RF signal associated with the second network is illustrated as a second port P2 (e.g., a second wireless communication 12). According to example embodiments, the second RFIC 122 is implemented the same as or similar to the first RFIC 121, and the discussion of the first RFIC 121 contained herein also applies to the second RFIC 122.

The first RFIC 121 may provide a reception signal RX as a baseband signal to the processor 110 by processing the RF signal received from the antenna array 140, and may provide the RF signal to the antenna array 140 by processing a transmission signal TX as the baseband signal. Specifically, the first RFIC 121 may provide RF resources associated with the first network and/or RF resources associated with the second network. The first RFIC 121 may be controlled by the processor 110, and may include a switch, a matching circuit, a filter, an amplifier, and/or a mixer.

The processor 110 may communicate with the first RFIC 121 through the baseband signals RX and TX. The processor 110 may have an architecture for processing connection associated with the first network 210 and connection associated with the second network 220. Depending on the implementation, the processor 110 may include a hardware block designed through logical synthesis, a processing unit including a software block including a series of instructions, at least one processor executing a series of instructions, and combinations thereof. The processor 110 may be referred to as a modem or a baseband processor.

The switching module 130 may switch RF paths P1 and P2 between the plurality of antennas included in the antenna array 140 and the first RFIC 121. The communication device 100 may transmit a reference signal that the base stations 211 and 221 may refer to for channel estimation, for example, a sounding reference signal (SRS), to the base stations 211 and 221.

The switching module 130 may perform SRS switching for selecting an antenna to which the SRS is output. For example, the antenna array 140 may include a first antenna and a second antenna for receiving signals associated with the first network. The switching module 130 may perform the SRS switching and output the SRS to the first base station 211 through the first antenna or the second antenna. When the first base station 211 may refer to both the SRS output through the first antenna and the SRS output through the second antenna, the first base station 211 may estimate a diversity channel based on the SRSs.

Depending on the implementation, the communication device 100 may be connected to the plurality of networks 210 and 220 in a multi-connectivity manner, for example, in a dual-connectivity manner, or may be connected to the plurality of networks 210 and 220 through multiple SIMs.

Referring to FIG. 1B, the communication device 100 may include a plurality of SIMs 111 and 112 in addition to the processor 110, the first RFIC 121, the second RFIC 122, the switching module 130, and/or the antenna array 140 described with reference to FIG. 1A.

The plurality of SIMs 111 and 112 (e.g., the first SIM 111 and the second SIM 112) may support multiple SIM wireless communication. For example, the first SIM 111 may include information for accessing the first network 210 by a first wireless communication 11, and the second SIM 112 may include information for accessing the second network 220 by a second wireless communication 12. The first wireless communication 11 and the second wireless communication 12 may be referred to as a first connection and a second connection, or may be referred to as a first subscription and a second subscription.

In the case of performing two wireless communications associated with the two SIMs 111 and 112, the wireless communication device 100 may be referred to as a dual-SIM device and may be operated as a dual-receive single transmit-dual-SIM dual-standby (DR-DSDS) device or a dual-SIM dual-active (DSDA) device.

Referring to FIG. 2A, a network environment 300 may support double access.

The network environment 300 may include a first cell 310 provided by a first base station 311 and a second cell 320 provided by a second base station 321. The first cell 310 may be included in the first network, and the second cell 320 may be included in the second network. For example, the first network may be an LTE network, and the second network may be a 5G NR network.

The first base station 311 may operate as a master node, and the second base station 321 may operate as a secondary node. The first base station 311 and the second base station 321 may be connected through a network interface to transmit or receive wireless resources, for example, messages associated with communication channel management, to or from each other. A communication device UE may transmit or receive a user message or a control message to or from a second base station 321 that is a 5G NR base station, using the first base station 311 which is an LTE base station. The communication device UE may correspond to the communication device 100 described with reference to FIG. 1A.

Referring to FIG. 2B, a network environment 400 may support dual SIM access.

The network environment 400 may include a first cell 410 provided by a first base station 411 and a second cell 420 provided by a second base station 421. The first cell 310 may be included in the first network, and the second cell 320 may be included in the second network. For example, the first network may be an LTE network, and the second network may be a 5G NR network. As another example, both the first network and the second network may be LTE networks or 5G NR networks.

The communication device UE may be connected to the first base station 411 to perform communication associated with the first network, and the communication device UE may be connected to the second base station 421 to perform communication associated with the second network. The communication device UE may correspond to the communication device 100 described with reference to FIG. 1B.

In the communication device 100 described with reference to FIGS. 1A and 1B, the antenna array 140 may include a plurality of antennas so as to provide a diversity effect for each of the plurality of networks. With an increase in the number of antennas included in the antenna array 140, the size of the communication device 100 may increase, and the manufacturing costs of the communication device 100 may increase.

In order to reduce the number of antennas included in the antenna array 140 the communication device 100 may be considered to be designed such that the first network and the second network share at least some antennas. When the first network and the second network share at least some antennas, communication performance of the communication device 100 may be degraded. For example, when a signal associated with the second network is received at a timing when the communication device 100 outputs an SRS signal of the first network through a shared antenna, the shared antenna may not receive the signal associated with the second network.

According to example embodiments of the present disclosure, when a timing at which the SRS signal of the first network is output through the shared antenna overlaps timing at which the signal associated with the second network is to be received, and a priority of the signal associated with the second network is higher than a priority of the SRS signal, the communication device 100 may block (e.g., switch off) a signal path through which the SRS signal is output. Accordingly, the shared antenna may receive a signal having a higher priority without missing the signal.

According to example embodiments of the present disclosure, the number of antennas may be reduced using the shared antenna while minimizing (or reducing) a decrease in communication performance of the communication device 100. Accordingly, it is possible to miniaturize the communication device 100, and to reduce the manufacturing costs. Hereinafter, a communication device according to example embodiments of the present disclosure will be described in more detail with reference to FIGS. 3A to 13.

Figure 3A:
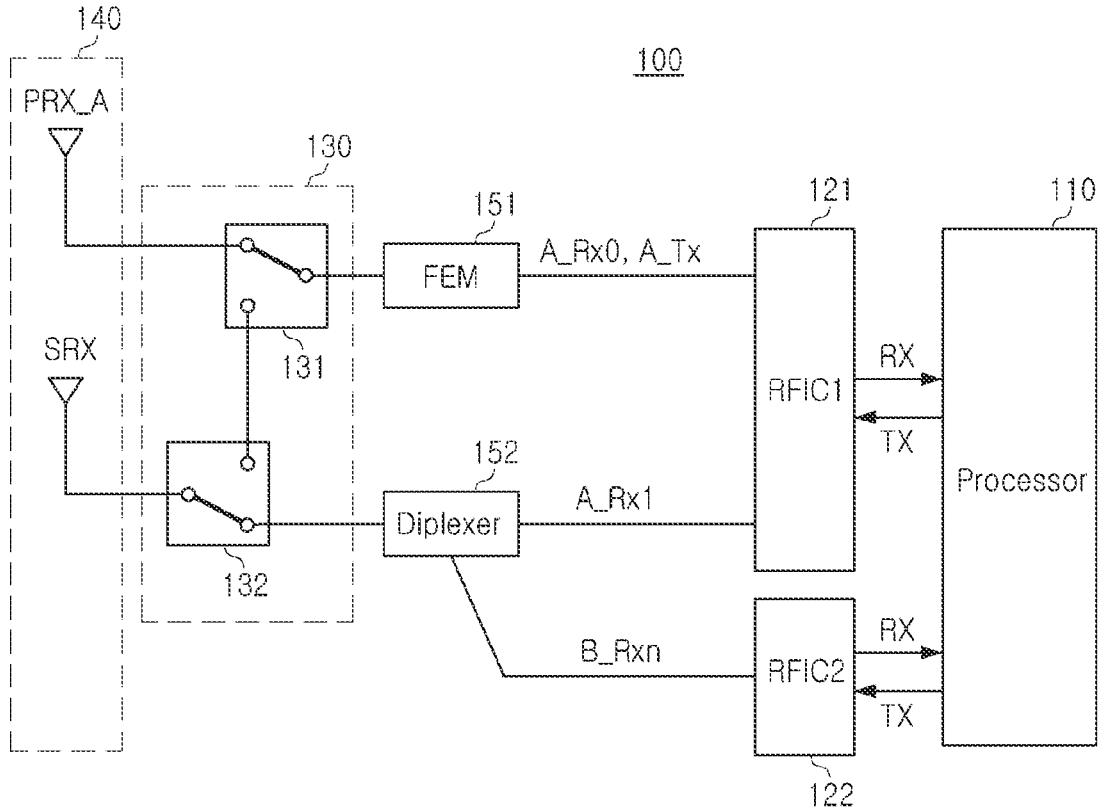
FIGS. 3A and 3B are diagrams illustrating a communication device according to example embodiments of the present disclosure.
Figure 3B:
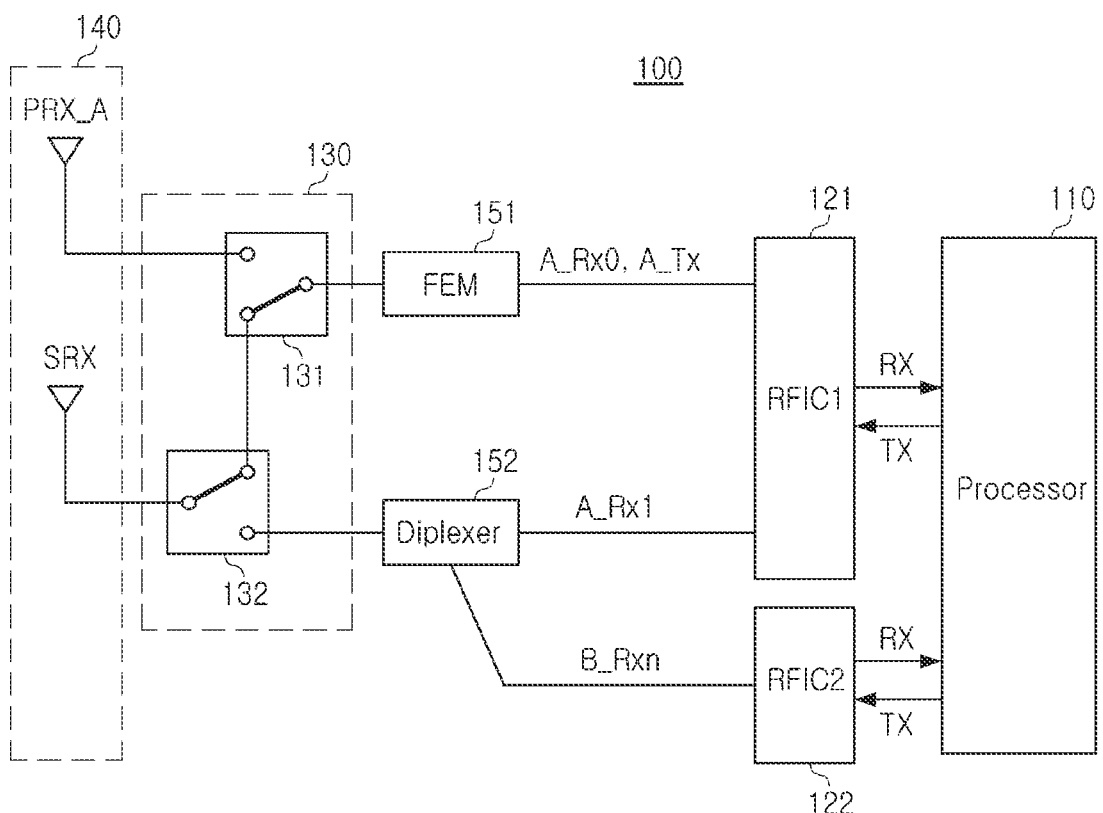

FIGS. 3A and 3B are diagrams illustrating a communication device according to example embodiments of the present disclosure.

Referring to FIG. 3A, the communication device 100 may include a processor 110, a first RFIC 121, a second RFIC 122, a switching module 130, an antenna array 140, a front-end module (FEM) 151, and/or a diplexer 152. The processor 110, the first RFIC 121, the second RFIC 122, the switching module 130, and/or the antenna array 140 of FIG. 3A may correspond to those described with reference to FIG. 1A.

The antenna array 140 may include a first antenna PRX_A and a second antenna SRX. The first antenna PRX_A may be a primary antenna for the first network. That is, the first antenna PRX_A may receive the signal associated with the first network from the base station or transmit the signal associated with the first network to the base station.

The second antenna SRX may be a diversity antenna for the first network. The second antenna SRX may receive the signal associated with the first network along with the first antenna PRX_A. The communication device 100 may synthesize signals received from the first antenna PRX_A and the second antenna SRX, thus improving reliability of the received signal.

According to example embodiments of the present disclosure, the second antenna SRX may receive a signal for the second network as well as a signal for the first network. Hereinafter, the first antenna PRX_A may be referred to as a dedicated antenna, and the second antenna SRX may be referred to as a shared antenna.

The processor 110 may perform communication associated with the first network and the second network. The processor 110 may control transmission and reception of the signals associated with the first network and the second network according to a timing determined based on a configuration with the base station. That is, the processor 110 may output the transmission signal or receive the reception signal according to the timing. For example, the processor 110 may generate the SRS associated with the first network and control the SRS to be output to the first antenna PRX_A or the second antenna SRX at a predetermined (or alternatively, given) timing.

The first RFIC 121 may be connected to the antenna array 140 and the processor 110 and may provide an RF path for wireless communication. The first RFIC 121 may provide a transmission path A_Tx, a primary reception path A_Rx0, and a diversity reception path A_Rx1, associated with the first network. In addition, the second RFIC 122 may be provided with an RF path associated with the second network, for example, a reception path B_Rxn.

The transmission path A_Tx and the primary reception path A_Rx0 may be connected to the first antenna PRX_A, and the diversity reception path A_Rx1 and the reception path B_Rxn may be connected to the second antenna SRX. The transmission path A_Tx and the primary reception path A_Rx0 may correspond to the first port P1 of FIGS. 1A and 1B, and the diversity reception path A_Rx1 may correspond to the second port P2 of FIGS. 1A and 1B.

The front-end module 151 may switch the transmission path A_Tx and the primary reception path A_Rx0 associated with the first network. When the first network operates in a time division duplexing (TDD) manner, the transmission path A_Tx and the reception path A_Rx0 may be isolated in time. The front-end module 151 may be controlled by the processor 110.

The diplexer 152 may separate a first reception signal received from the first network (e.g., the diversity reception path A_Rx1) from a second reception signal received from the second network (e.g., the reception path B_Rxn). For example, the first reception signal and the second reception signal received through the second antenna SRX may have different frequencies. The diplexer 152 may include a frequency filter, and may divide a signal received through the second antenna SRX into the first reception signal and the second reception signal based on a reference frequency.

The switching module 130 may include first and second switches 131 and 132. The first switch 131 may switch a connection between the first antenna PRX_A and the front-end module 151 and a connection between the second switch 132 and the front-end module 151. The second switch 132 may switch a connection between the second antenna SRX and the first switch 131 and a connection between the second antenna SRX and the diplexer 152.

By switching the connection, the switching module 130 may switch a first transmission path for transmitting the SRS associated with the first network through the first antenna PRX_A and a second transmission path for transmitting the SRS associated with the first network through the second antenna SRX.

FIG. 3A illustrates a first state in which the switching module 130 electrically connects the front-end module 151 to the first antenna PRX_A and electrically connects the diplexer 152 to the second antenna SRX. In the first state, the first switch 131 may electrically connect the first antenna PRX_A to the front-end module 151 and the second switch 132 may electrically connect the second antenna SRX to the diplexer 152. In the first state, the signal associated with the first network may be transmitted or received through the first antenna PRX_A. In addition, the signal associated with the first network and the signal associated with the second network may be received through the second antenna SRX. In the first state, the SRS associated with the first network may be output to the first antenna PRX_A through the front-end module 151.

The communication device 100 illustrated in FIG. 3B may have the same structure as (or a similar structure to) the communication device 100 illustrated in FIG. 3A. However, FIG. 3B illustrates a second state in which the switching module 130 connects the front-end module 151 to the second antenna SRX. In the second state, the first switch 131 may electrically connect the second switch 132 to the front-end module 151, and the second switch 132 may electrically connect the second antenna SRX to the first switch 131. The communication device 100 may transmit the SRS associated with the first network through the second antenna SRX in order to inform the base station of a channel state of the diversity reception path associated with the first network. In the second state, the SRS associated with the first network may be output through the second antenna SRX.

In the second state, the second antenna SRX and the diplexer 152 may be electrically separated from each other. That is, at least a portion of the reception path of the second network may be blocked (e.g., switched off) at a timing when the SRS associated with the first network is output through the second antenna SRX.

Each of the first network and the second network may transmit and receive signals in the TDD manner. For example, the communication device 100 and the first base station 211 may transmit and receive signals in synchronization with each other. Accordingly, the signal associated with the first network may not be received at the timing when the SRS associated with the first network is transmitted.

However, signal transmission/reception timings of the first network and signal transmission/reception timings of the second network may be independent of each other. That is, the communication device 100 may be in an asynchronous state between the signal transmission/reception associated with the first network and the signal transmission/reception associated with the second network. Accordingly, the signal associated with the second network may be received at the timing when the SRS associated with the first network is transmitted. When at least a portion of the reception path of the second network is blocked at the timing when the SRS associated with the first network is transmitted, the communication device 100 may miss the signal associated with the second network.

According to example embodiments of the present disclosure, the processor 110 may confirm priority of the reception signal to be received through the second antenna SRX at a timing when the SRS for the second antenna SRX is to be output from the first RFIC 121. In addition, when the priority of the reception signal is higher than priority of the SRS, the processor 110 may control the switching module 130 so as to switch to the first state in which the front-end module 151 is electrically separated from the second antenna SRX and the diplexer 152 is electrically connected to the second antenna SRX.

According to example embodiments of the present disclosure, the communication device 100 may use the second antenna SRX as a shared antenna of the first network and the second network, and may simultaneously (or contemporaneously) receive a higher-priority signal associated with the second network through the second antenna SRX. Accordingly, while the number of antennas that the communication device 100 holds to access the first network and the second network is reduced, deterioration of communication performance of the communication device 100 may be minimized (or reduced).

The processor 110 may confirm a transmission timing of the SRS signal and a reception timing of a signal having a higher priority based on signal transmission/reception timings of the first network and the second network defined according to the protocol. Hereinafter, a protocol stack system of the communication device 100 will be described.

Figure 4:
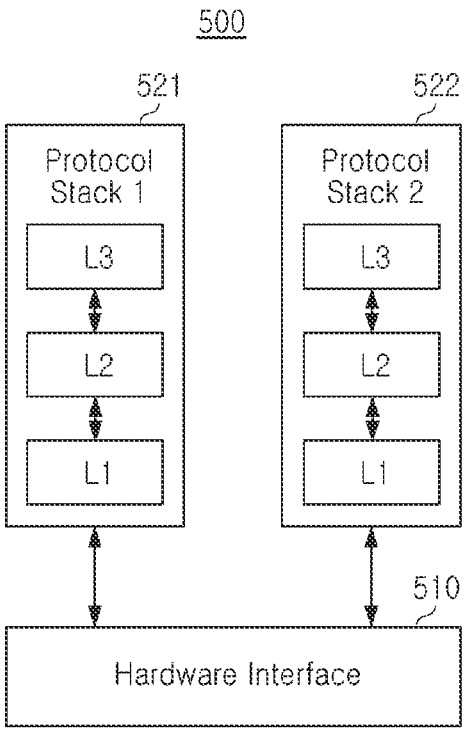
FIG. 4 is a diagram illustrating a protocol stack system according to example embodiments of the present disclosure.

FIG. 4 is a diagram illustrating a protocol stack system according to example embodiments of the present disclosure.

FIG. 4 illustrates a protocol stack system 500 including a first protocol stack 521 and a second protocol stack 522. The protocol stack system 500 may be implemented by the processor 110 described with reference to FIGS. 1A-1B. The processor 110 may perform operations for wireless communication by the protocol stack system 500. The blocks illustrated in FIG. 4 may be implemented by hardware logic or may be implemented by a software module. For example, when the first and second protocol stacks 521 and 522 are implemented as the software module, the software module may be operated by the processor 110.

Referring to FIG. 4, the protocol stack system 500 may include a first protocol stack 521 (may also be referred to herein as a first protocol stack system) for accessing the first network and a second protocol stack 522 (may also be referred to herein as a second protocol stack system) for accessing the second network. As described with reference to FIGS. 1A-1B, each of the first network and the second network may support any RAT. According to example embodiments of the present disclosure, the first protocol stack 521 and the second protocol stack 522 may interact with a shared upper layer (may also be referred to herein as an upper layer system), for example, an application layer. The upper layer may acquire information on the first wireless communication 11 and the second wireless communication 12 described with reference to FIGS. 1A-1B, or may provide an interface to programs configured to provide commands.

The protocol stack system 500 may include a hardware interface 510 shared by the first protocol stack 521 and the second protocol stack 522. The hardware interface 510 may provide an interface for hardware, that is, the first RFIC 121 (and/or the second RFIC 122) of FIGS. 1A-1B. The first and second protocol stacks 521 and 522 may provide the signal to the first RFIC 121 (and/or the second RFIC 122) through the hardware interface 510 or may obtain the signal from the first RFIC 121 (and/or the second RFIC 122). According to example embodiments of the present disclosure, the hardware interface 510 may be referred to as a driver of the first RFIC 121 (and/or the second RFIC 122).

Each of the first and second protocol stacks 521 and 522 may include a plurality of layers. For example, the first protocol stack 521 may include a first layer L1, a second layer L2, and a third layer L3, and the first layer L1, the second layer L2, and the third layer L3 may correspond to lower three layers of an open system interconnection (OSI) model. For example, in LTE or 5G NR, a physical (PHY) layer may be included in the first layer L1, a medium access control (MAC) layer, a radio link control (RLC) layer, and a packet data convergence protocol (PDCP) layer may be included in the second layer L2, and a radio resource control (RRC) layer and a non-access stratum (NAS) layer may be included in the third layer L3. The second protocol stack 522 may also include a first layer L1, a second layer L2, and a third layer L3, similarly to the first protocol stack 521.

According to example embodiments of the present disclosure, the upper layer shared by the first and second protocol stacks 521 and 522 may confirm whether a timing when the SRS associated with the first network will be output based on the signal transmission/reception timing of the first and second networks overlaps a timing when a reception signal associated with the second network will be received. When the timings overlap each other, the upper layer may control the switching module 130 according to whether the priority of the reception signal is higher than the priority of the SRS.

Hereinafter, an example of a communication device according to example embodiments of the present disclosure will be described in more detail with reference to FIGS. 5 to 11.

Figure 5:
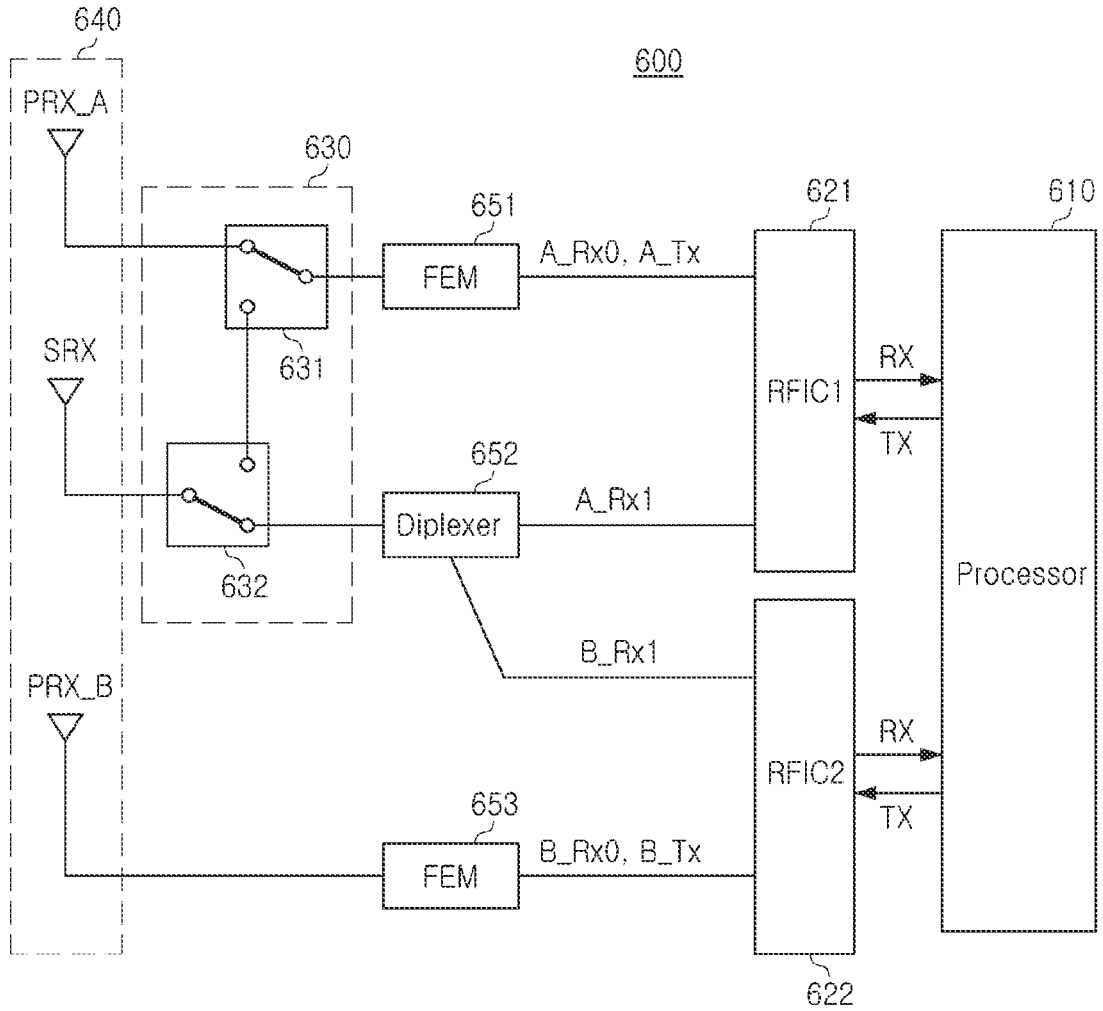
FIG. 5 is a diagram illustrating a communication device according to example embodiments of the present disclosure.

FIG. 5 is a diagram illustrating a communication device according to example embodiments of the present disclosure.

Referring to FIG. 5, a communication device 600 may include a processor 610, a first RFIC 621, a second RFIC 622, a switching module 630, an antenna array 640, first and second front-end modules 651 and 653, and/or a diplexer 652.

The communication device 600 of FIG. 5 may have a structure similar to that of the communication device 100 described with reference to FIGS. 3A and 3B, except that the communication device 600 further includes the second front-end module 653 and a third antenna PRX_B. In describing the communication device 600, common descriptions with the communication device 100 of FIGS. 3A and 3B, may be omitted.

The antenna array 640 may include a first antenna PRX_A, a second antenna SRX, and the third antenna PRX_B. The first antenna PRX_A may be a primary antenna for the first network, and the third antenna PRX_B may be a primary antenna for the second network. The second antenna SRX is a shared antenna and may be a diversity antenna for the first network and the second network. The communication device 600 may provide a diversity effect for each of the two networks using three antennas PRX_A, SRX, and PRX_B.

The first RFIC 621 may provide a transmission path A_Tx, a primary reception path A_Rx0, and a diversity reception path A_Rx1, associated with the first network. In addition, the second RFIC 622 may provide a transmission path B_Tx, a primary reception path B_Rx0, and a diversity reception path B_Rx1, associated with the second network. The transmission path A_Tx and the primary reception path A_Rx0 may be connected to the first antenna PRX_A, and the diversity reception path A_Rx1 may be connected to the second antenna SRX. In addition, the transmission path B_Tx and the primary reception path B_Rx0 may be connected to the third antenna PRX_B, and the diversity reception path B_Rx1 may be connected to the second antenna SRX.

The first front-end module 651 may switch the transmission path A_Tx and the primary reception path A_Rx0, associated with the first network, and the second front-end module 653 may switch the transmission path B_Tx and the primary reception path B_Rx0, associated with the second network.

The switching module 630 may include first and second switches 631 and 632. Similar to those described with reference to FIGS. 3A and 3B, the switching module 630 may switch a first state in which the first front-end module 651 is electrically connected to the first antenna PRX_A and the diplexer 652 is electrically connected to the second antenna SRX; and a second state in which the first front-end module 651 is electrically connected to the second antenna SRX and the diplexer 652 is electrically disconnected from the second antenna SRX. The processor 610 may transmit the SRS associated with the first network to the base station through the first antenna PRX_A or the second antenna SRX by switching the state of the switching module 630. The base station may estimate a channel state in consideration of a diversity effect based on the SRS received from the first antenna PRX_A and the second antenna SRX.

Depending on the implementation, the communication device 600 may not include a switching module for switching the connection of the second antenna SRX and the third antenna PRX_B, and the SRS associated with the second network may be transmitted only through the third antenna PRX_B.

According to example embodiments of the present disclosure, the communication device 600 may block a transmission path for the first network and receive a reception signal to the second network when a timing when the SRS for the first network is output through the second antenna SRX overlaps a timing when a higher priority reception signal for the second network will be received.

Hereinafter, a method for confirming whether the timing when the SRS for the first network is output overlaps the timing when the reception signal for the second network is received will be described in detail.

Figure 6A:
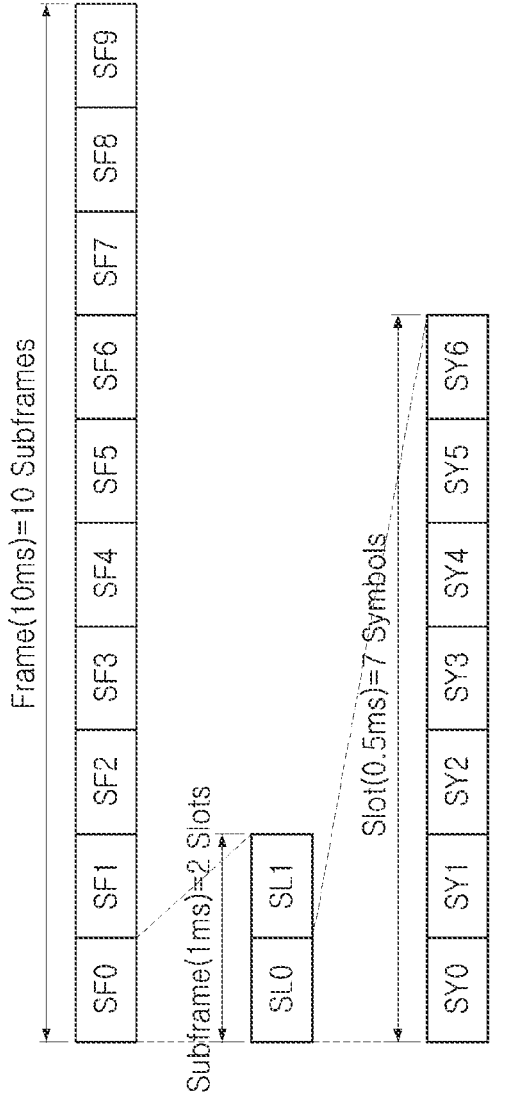
FIGS. 6A and 6B are diagrams illustrating frame structures of an LTE system and a 5G new radio (5G NR) system.
Figure 6B:
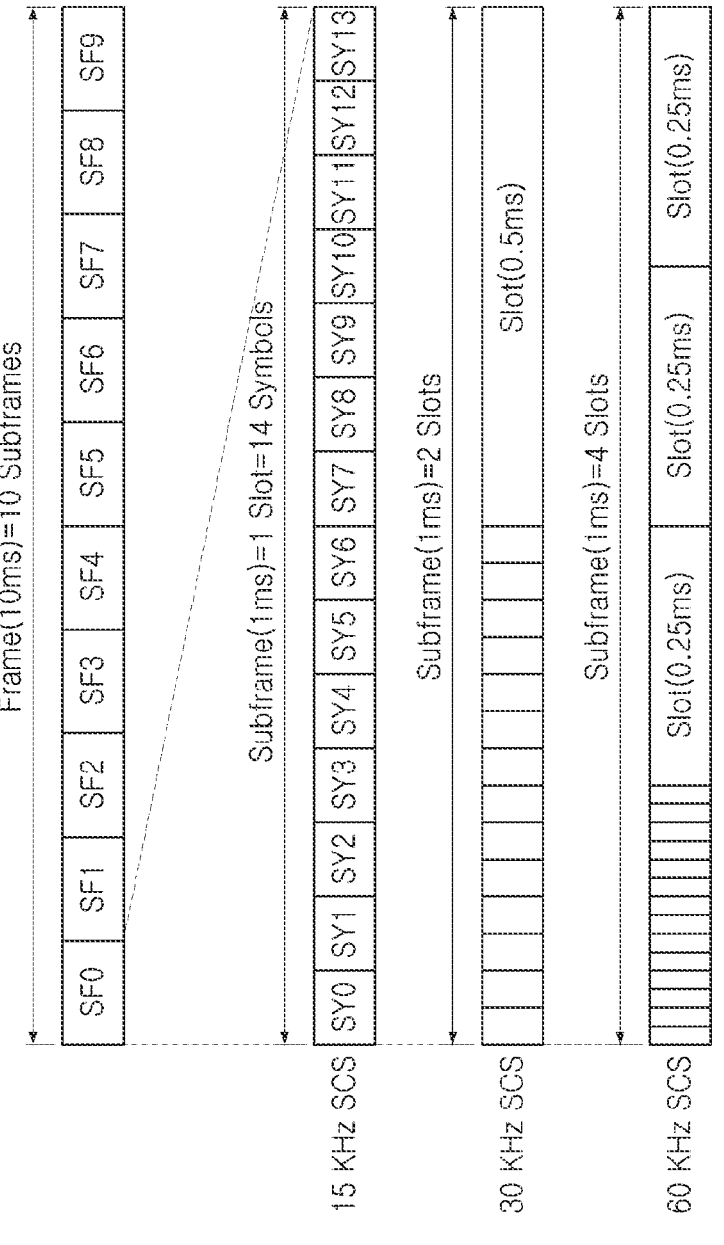

FIGS. 6A and 6B are diagrams illustrating frame structures of an LTE system and a 5G NR system.

The communication device 600 may communicate with the first network and the second network according to any radio access technology (RAT). Specifically, a frame structure may be defined according to the RAT. The communication device 600 may transmit or receive signals to or from the base station according to the frame structure. The frame may refer to a unit of communication time. As an example of a frame structure according to RAT, FIG. 6A illustrates a frame structure of an LTE system, and FIG. 6B illustrates a frame structure of a 5G NR system.

Referring to FIG. 6A, in the LTE system, one frame may have a length of 10 ms, and one frame may include 10 subframes SF0 to SF9. One subframe may include two consecutive slots SL0 and SL1. One slot may include seven symbols SY0 to SY6.

Referring to FIG. 6B, in the 5G NR system, one frame may have a length of 10 ms, and one frame may include 10 subframes SF0 to SF9. In the 5G NR system, one subframe may have a different number of slots depending on subcarrier spacing (SCS). The SCS may refer to a bandwidth of one subcarrier in a frequency domain in an orthogonal frequency division multiplexing (OFDM) structure. As a first example, when the SCS is 15 kHz, one subframe may have one slot, and one slot may include 14 symbols. As a second example, when the SCS is 30 kHz, one subframe may have two slots, and each of the two slots may include 14 symbols. As a third example, when the SCS is 60 kHz, one subframe may have four slots, and each of the four slots may include 14 symbols.

The communication device 600 may transmit and receive the signal in the TDD manner. In the case of the TDD, transmission may be divided into uplink transmission and downlink transmission are divided in time based on one cell. Since the same carrier is (or similar carriers are) used for the uplink transmission and the downlink transmission, the base station and the communication device 600 repeatedly switch between an uplink transmission period and a downlink transmission period. The frame may include uplink transmission periods and downlink transmission periods. In addition, a frame period may further include a guard time for switching of the uplink transmission period and the downlink transmission period.

In the case of the TDD, time resources included in one frame may be allocated to the uplink transmission period and the downlink transmission period. The base station may determine resource allocation for the time resources and may inform the communication device 600 of the resource allocation. The communication device 600 may transmit or receive the signal at a predetermined (or alternatively, given) time according to the resource allocation determined by the base station.

FIGS. 7A and 7B are diagrams illustrating resource allocation of the LTE system and the 5G NR system.

Referring to FIG. 7A, the time resources may be allocated in subframe units in the LTE system. Specifically, each of the subframes included in one frame may be allocated to an uplink transmission period, a downlink transmission period, or a protection period. Resource allocation information for one frame may be referred to as a frame configuration.

The frame configuration may indicate whether each of the subframes included in one frame is a downlink subframe D, an uplink subframe F, or a special subframe S corresponding to the protection period. In the LTE system, seven frame configurations may be predefined (or alternatively, given). The base station may inform the communication device 600 of the resource allocation information by informing the communication device 600 of identifiers 0 to 6 indicating any one of the seven frame configurations.

Referring to FIG. 7B, the time resources may be allocated in symbol units in a 5G NR system. Specifically, each of the symbols included in one slot may be allocated to the uplink transmission period, the downlink transmission period, or a flexible period. The resource allocation information for one slot may be referred to as a slot format.

The slot format may indicate whether each of the symbols included in one slot is a downlink symbol D, an uplink symbol U, or a flexible symbol F. In the flexible symbol F, either the downlink transmission or the uplink transmission may be performed. A plurality of slot formats may be predefined (or alternatively, given) in the 5G NR system. The base station may inform the communication device 600 of the resource allocation information by informing the communication device 600 of identifiers 0 to 255 indicating any one of the predefined (or alternatively, given) slot formats. According to example embodiments, identifier 255 indicates that the communication device 600 is to determine the slot format based on TDD-uplink (UL)-downlink (DL)-Configuration Common, or TDD-UL-DL-Configuration-Dedicated and, if any, on detected downlink control indicator (DCI) formats.

As described with reference to FIGS. 6A to 7B, the communication device 600 and the base station may be synchronized and perform communication according to a predetermined (or alternatively, given) resource allocation. However, when the communication device 600 communicates with the plurality of base stations included in each of the plurality of networks, communication for different networks may be performed asynchronously.

Figure 8:
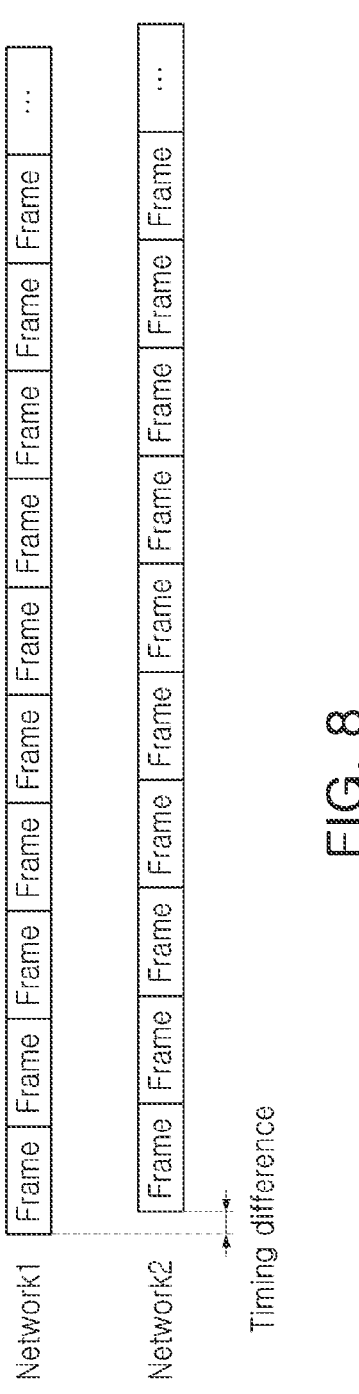
FIG. 8 is a diagram illustrating signal transmission/reception timings of a plurality of networks in a wireless communication system according to example embodiments of the present disclosure.

FIG. 8 is a diagram illustrating signal transmission/reception timings of a plurality of networks in a wireless communication system according to example embodiments of the present disclosure.

When the synchronization between the first base station included in the first network and the communication device 600 is completed, the communication device 600 and the first base station may be synchronized and perform communication within continuous frames. Likewise, when the synchronization between the second base station included in the second network and the communication device 600 is completed, the communication device 600 and the second base station may be synchronized and perform communication within the continuous frames.

A first synchronization between the first base station and the communication device 600 and a second synchronization between the second base station and the communication device 600 may be independently performed. That is, the completion time of the first synchronization and the completion time of the second synchronization may be irrelevant to each other, and the communication of the first network and the second network is asynchronous with each other. FIG. 8 illustrates a case in which a timing difference occurs between a start time point of a frame of the first network and a start time point of a frame of the second network due to a timing difference between the first synchronization and the second synchronization.

According to example embodiments of the present disclosure, the communication device 600 may compare a transmission/reception timing of the first network with a transmission/reception timing of the second network based on a common clock signal. The transmission/reception timing of the first network may be determined by the first base station, and the transmission/reception timing of the second network may be determined by the second base station. The communication device 600 may determine the timing difference between the first network and the second network based on the common clock signal. According to example embodiments, the timing difference may be a difference between a start of a first frame communicated via the first network and a start of a second frame communicated via the second network. The start of the second frame being the nearest in time to the start of the first frame among frames communicated via the second network. According to example embodiments, the timing difference may be a difference between an end of the first frame and an end of the second frame. The communication device 600 may confirm whether a higher-priority signal is received in the second network at a time when SRS associated with the first network is transmitted based on the transmission/reception timing of the first network, the transmission/reception timing of the second network, and the timing difference.

A type of signals to be exchanged between the first base station and the communication device 600 and the second base station and the communication device 600, and when the signals are to be exchanged, may be scheduled in advance. For example, the first base station may include information on a time point to transmit the SRS in a radio resource control (RRC) reconfiguration message and transmit the information to the communication device 600.

Figure 9:
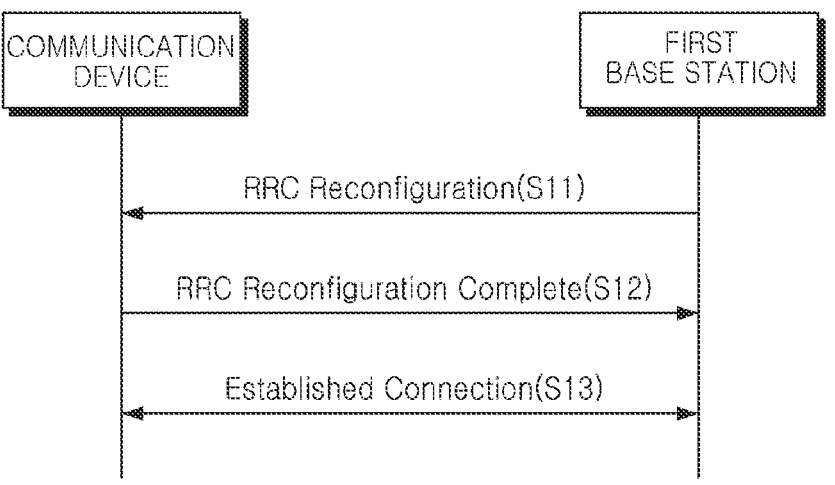
FIG. 9 is a flowchart illustrating a signal transmission/reception procedure between the communication device and the network according to example embodiments of the present disclosure.

FIG. 9 is a flowchart illustrating a signal transmission/reception procedure between a communication device and a network according to example embodiments of the present disclosure.

In operation S11, the first base station may transmit the RRC reconfiguration message to the communication device 600. For example, the first base station may transmit the RRC reconfiguration message in response to an RRC request message transmitted by the communication device 600.

The RRC reconfiguration message may include information on a timing when the communication device 600 will transmit the SRS for the first network, respectively, for each of the first antenna PRX_A and the second antenna SRX. For example, the RRC reconfiguration message may include information that sets the SRS to be transmitted through the first antenna PRX_A in an eighth slot and the SRS to be transmitted through the second antenna SRX in an eighteenth slot within one frame. In addition, the RRC reconfiguration message may further include information indicating how many symbols will be allocated for the SRS. According to example embodiments, the communication device 600 may determine and/or set the timing at which the SRS is to be transmitted through the first antenna PRX_A and/or the second antenna SRX based on the information included in the RRC reconfiguration message.

In operation S12, the communication device 600 may transmit an RRC reconfiguration complete message to the first base station. When the RRC reconfiguration procedure is normally completed, RRC connection establishment between the communication device 600 and the first base station may be completed in operation S13.

Although FIG. 9 illustrates that the RRC reconfiguration message includes information on the time point to transmit the SRS, the RRC reconfiguration message may further include information on a time point to transmit various types of signals.

Figure 10:
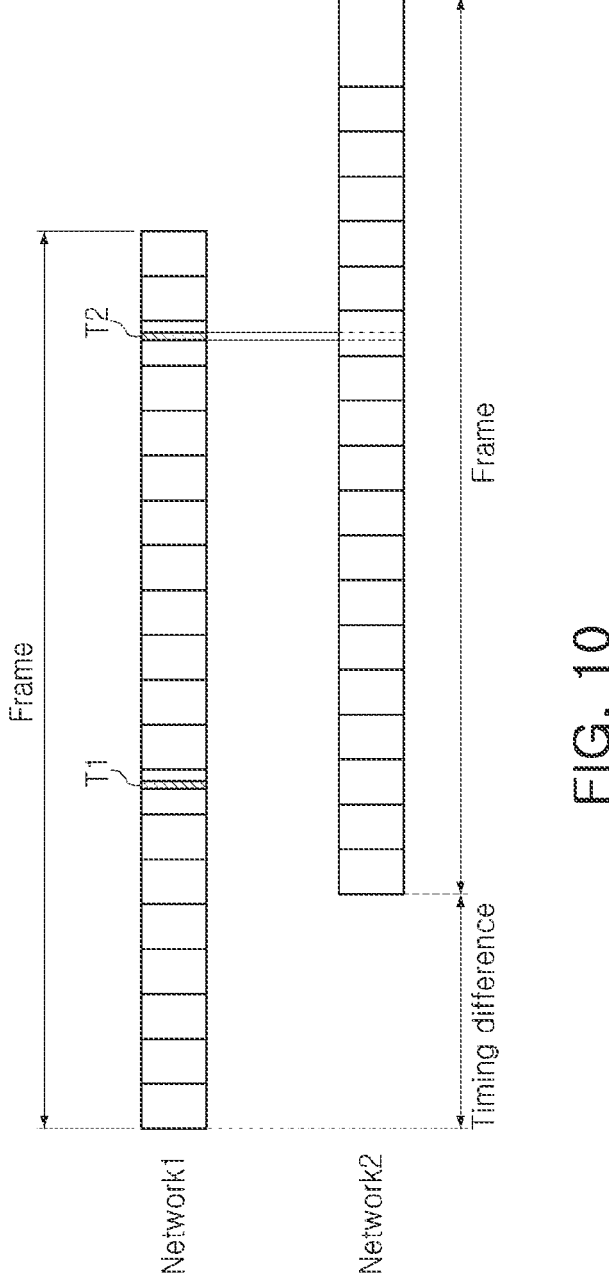
FIG. 10 is a diagram illustrating a transmission timing of a reference signal and a reception timing of a signal in a wireless communication system according to example embodiments of the present disclosure.

FIG. 10 is a diagram illustrating a transmission timing of a reference signal and a reception timing of a signal in a wireless communication system according to example embodiments of the present disclosure.

FIG. 10 illustrates a frame of the first network, a frame of the second network, and a timing difference between the two frames. The frame of the first network illustrates a first timing T1 when the SRS will be transmitted to the first antenna PRX_A and a second timing T2 when the SRS will be transmitted to the second antenna SRX. Although not illustrated in detail in FIG. 10, timings when not only the SRS but also various types of signals are transmitted or received in the frame of the first network may be determined. Likewise, timings when various types of signals are transmitted or received may be determined in the frame of the second network. According to example embodiments, the term "timing" as used herein may refer to a time period (e.g., a time period during which a slot and/or subframe is transmitted or received).

As described with reference to FIG. 8, the communication device 600 may determine (e.g., confirm) the timing difference between the two frames using the common clock. Based on the timing difference, the communication device 600 may determine (e.g., confirm) whether a signal associated with the second network is transmitted or the signal associated with the second network is received at the second timing T2. In addition, when the signal associated with the second network is received at the second timing T2, the communication device 600 may confirm what type of signal the signal will be received is.

According to the confirmation results, the communication device 600 may determine whether priority of the signal to be received in the second network is higher than priority of the SRS associated with the first network. In addition, the communication device 600 may output the SRS to the second antenna SRX or block the output of the SRS at the second timing T2 by controlling the switching module 630 according to the determination results.

Figure 11:
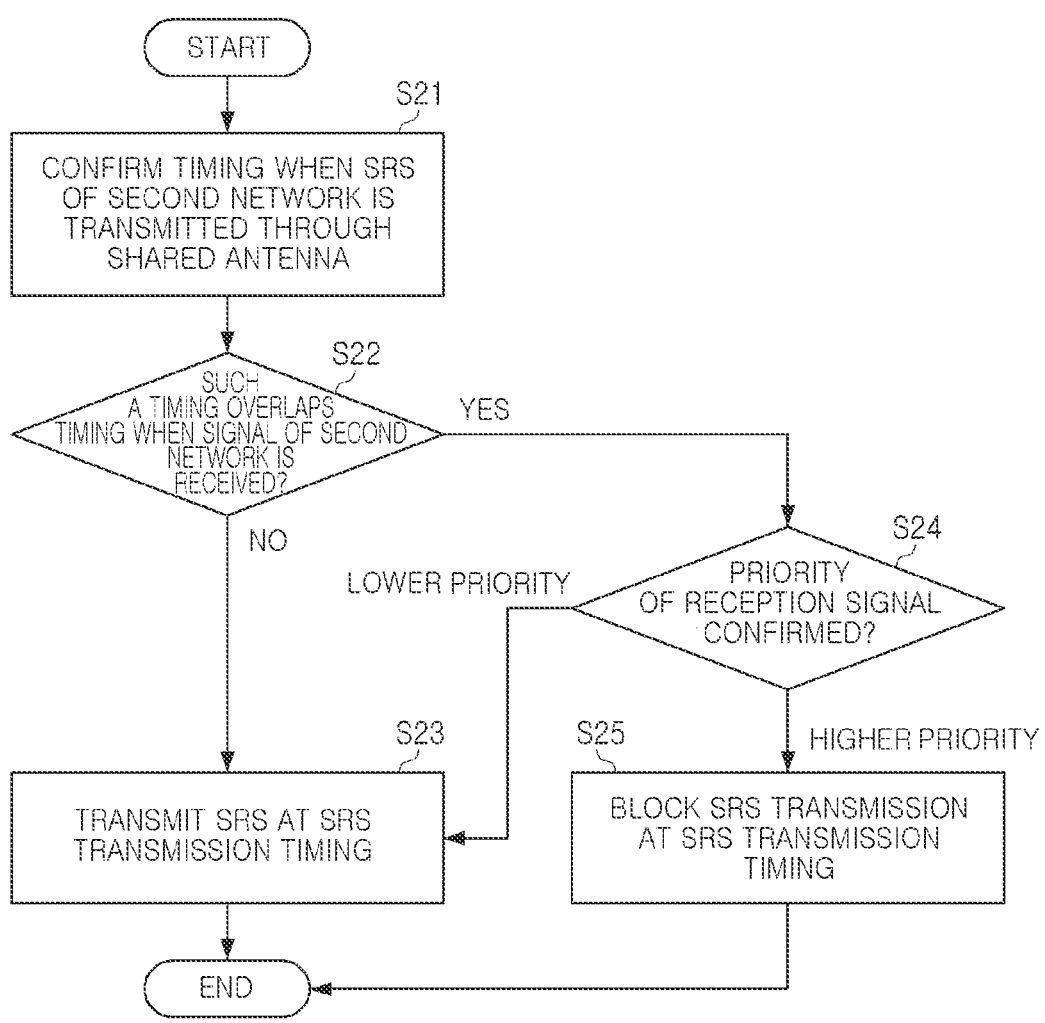
FIG. 11 is a flowchart illustrating a wireless communication method of a communication device according to example embodiments of the present disclosure.

FIG. 11 is a flowchart illustrating a wireless communication method of a communication device according to example embodiments of the present disclosure.

In operation S21, the communication device 600 may identify an SRS transmission timing of the first network through the shared antenna, that is, the second antenna SRX.

In operation S22, the communication device 600 may determine whether the SRS transmission timing overlaps a signal reception timing of the second network.

When the SRS transmission timing and the signal reception timing do not overlap each other ("No" in operation S22), the communication device 600 may transmit the SRS through the second antenna SRX at the SRS transmission timing.

According to example embodiments of the present disclosure described with reference to FIG. 5, when the SRS transmission timing overlaps the signal transmission timing of the second network, the signal of the second network may be transmitted through the third antenna PRX_B. Accordingly, the SRS transmission and signal transmission of the second network may be simultaneously (or contemporaneously) performed.

When the SRS transmission timing and the signal reception timing overlap each other ("Yes" in operation S22), in operation S24, the communication device 600 may confirm whether priority of the reception signal of the second network is higher than the priority of the SRS.

Examples of signals whose priority is higher than the priority of the SRS include a reference signal, a paging signal, and/or a synchronization signal.

The reference signal may include a data pattern in which the base station and the communication device 600 know each other. Upon receiving the reference signal, the communication device 600 may determine a channel decoding method by comparing the reference signal with the known data pattern. When the communication device 600 does not normally receive the reference signal due to the transmission of the SRS, the communication device 600 may have difficulty normally decoding the signals received after receiving the reference signal. Accordingly, a higher priority than the SRS may be assigned to the reference signal.

The paging signal may be a signal for the base station to inform the communication device 600 in advance that there is a call to the communication device 600. The communication device 600 may be switched to an idle state when there is no call from the base station, and may periodically poll the paging signal, for example, with a period of 360 ms. When the reception of the paging signal is confirmed, the communication device 600 may switch the idle state to an active state, and may receive a call from the base station in the active state. When the communication device 600 does not normally receive the paging signal due to the transmission of the SRS, the communication device 600 may not switch the idle state to the active state and fail to perform call connection. Accordingly, a higher priority than the SRS may be assigned to the paging signal.

The synchronization signal may be a signal transmitted by the base station so that the communication device 600 may start communication with the base station. The communication device 600 may receive a synchronization signal from an adjacent base station so as to be connected to the adjacent base station for mobile communication support. When the communication device 600 is located in a weak electric field, if the synchronization signal is not received from the adjacent base station, it may be difficult to perform smooth handover to the adjacent base station. Accordingly, when the communication device 600 is located in the weak electric field, a higher priority than the SRS may be assigned to the synchronization signal. The communication device 600 may determine whether the communication device 600 is located in the weak electric field based on at least one parameter (e.g., at least one of signal-to-interference-plus-noise ratio (SINR), reference signal received power (RSRP), received signal strength indicator (RSSI), reference signal received quality (RSRQ), or downlink block error rate (BLER)) associated with reception strength.

A signal whose priority is lower than the priority of the SRS may include a general data signal.

When the priority of a reception signal is higher than the priority of the SRS ("higher priority" in operation S24), in operation S25, the communication device 600 may block the transmission of the SRS at the SRS transmission timing by controlling the switching module 630. Specifically, the communication device 600 may block a path between the first RFIC 621 to which the SRS is output and the second antenna SRX.

When the priority of the reception signal is lower than the priority of the SRS ("lower priority" in operation S24), in operation S23, the communication device 600 may transmit the SRS at the SRS transmission timing by controlling the switching module 630. Specifically, the communication device 600 may connect the path between the first RFIC 621 to which the SRS is output and the second antenna SRX.

When the SRS is transmitted at the SRS transmission timing, the second antenna SRX may not receive the reception signal associated with the second network. Even if the third antenna PRX_B receives the reception signal, the reception signal may not be normally decoded because the diversity effect may not be obtained only by the signal received from the third antenna PRX_B. When the signal with the lower priority is not normally decoded, the communication device 600 may obtain a reception signal by requesting retransmission of the reception signal to the base station.

FIGS. 5 to 11 illustrate a case in which the communication device transmits the SRS associated with the second network only through the third antenna PRX_B, but example embodiments are not limited thereto. Hereinafter, an electronic device for switching an SRS transmission path for each of the first network and the second network will be described in detail with reference to FIGS. 12A to 13.

Figure 12A:
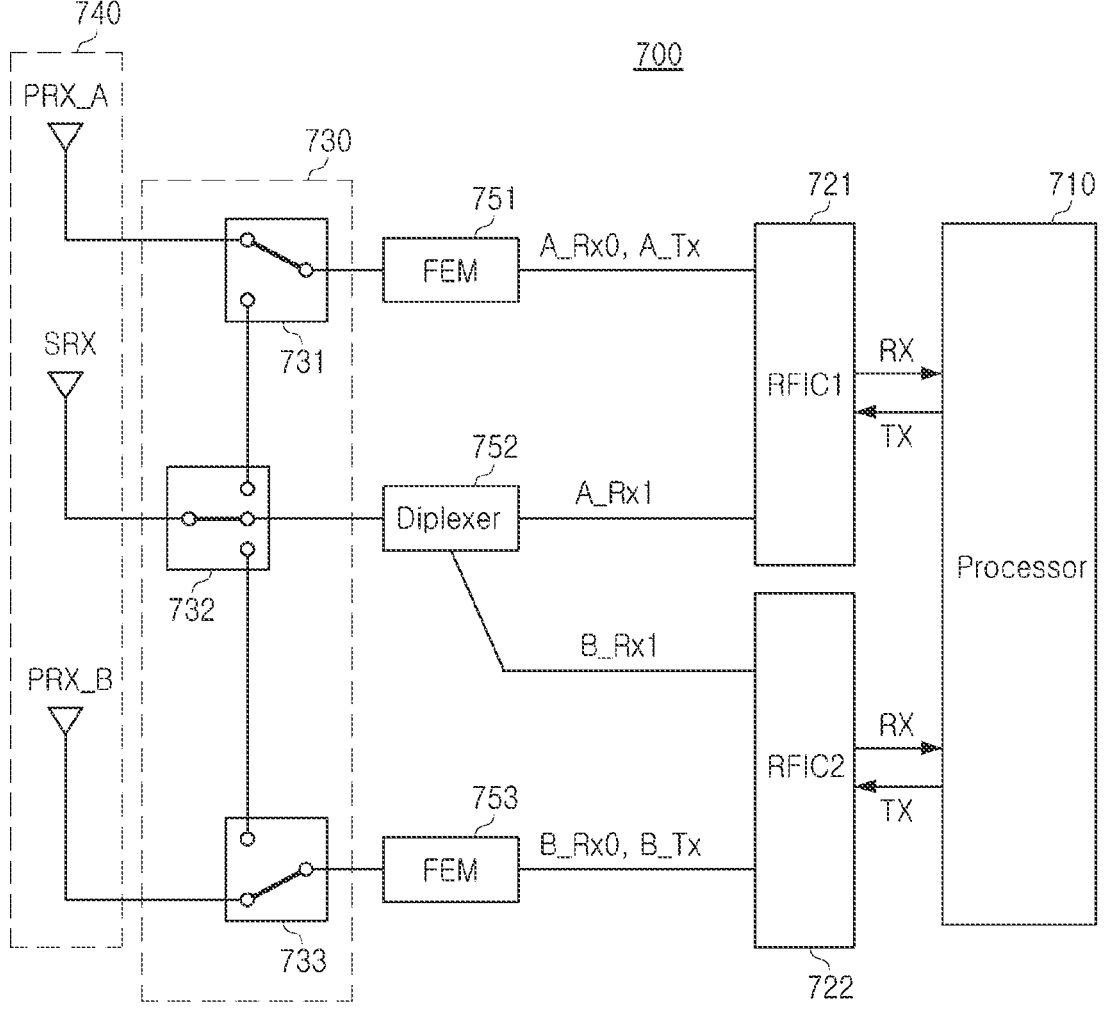
FIGS. 12A to 12C are diagrams illustrating a communication device according to example embodiments of the present disclosure.
Figure 12B:
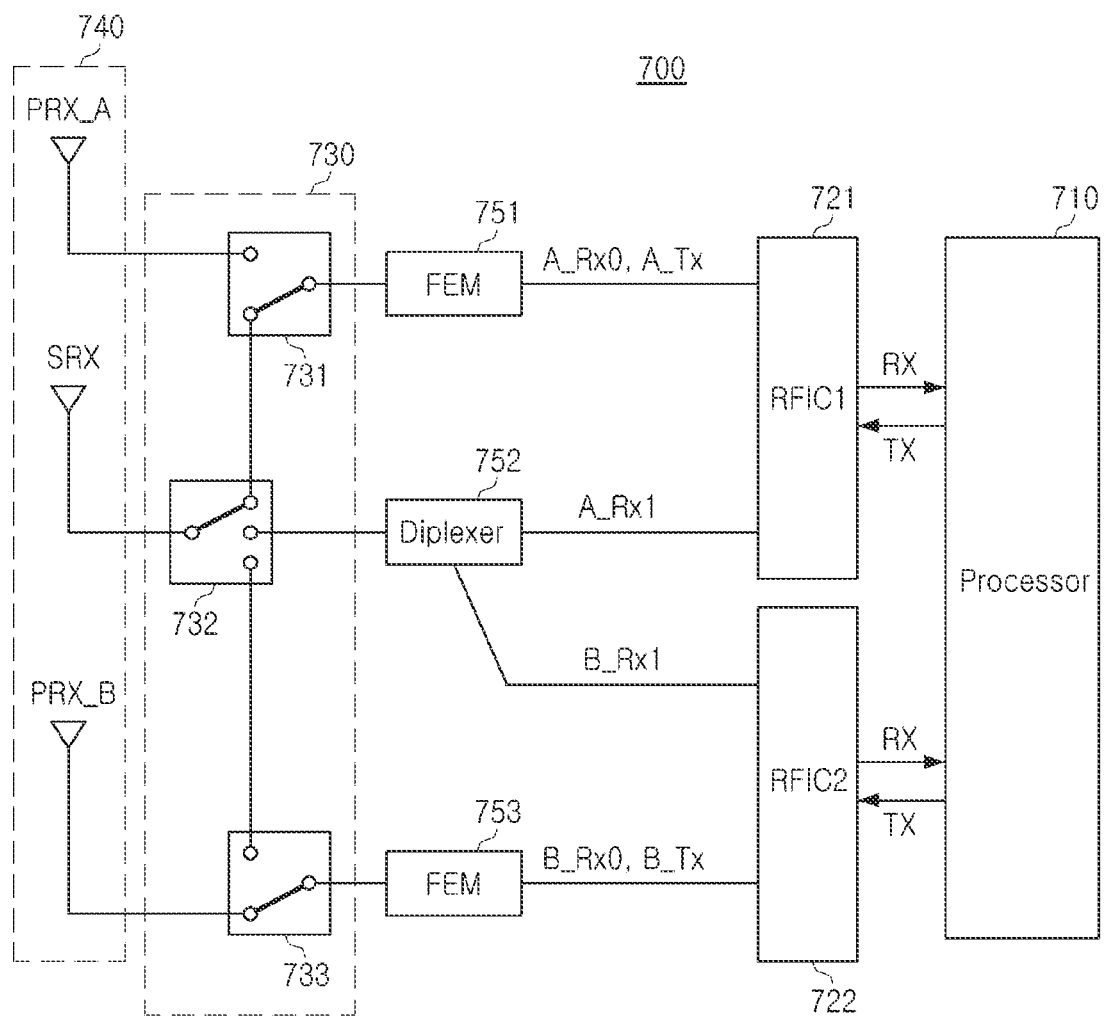
Figure 12C:
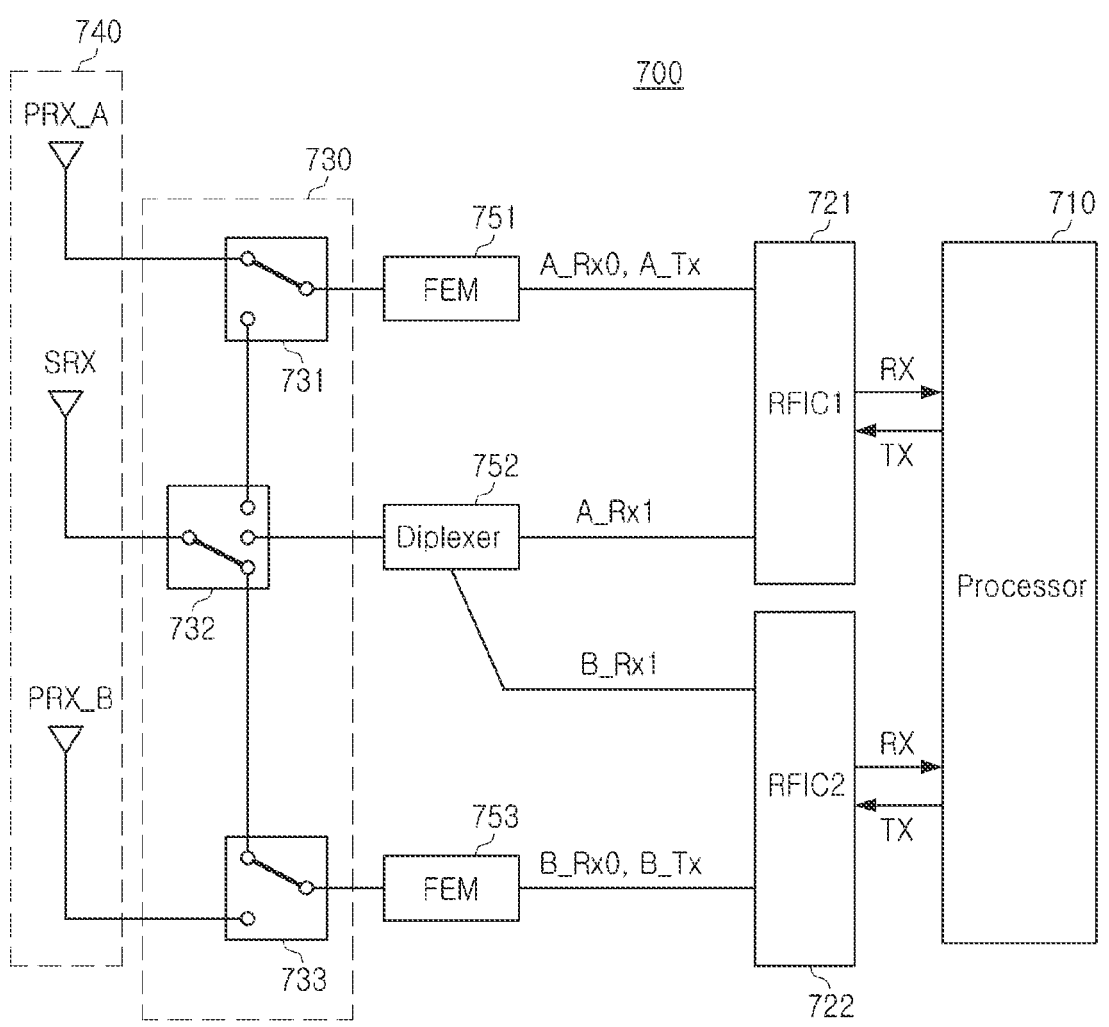

FIGS. 12A to 12C are diagrams illustrating a communication device according to example embodiments of the present disclosure.

Referring to FIG. 12A, a communication device 700 may include a processor 710, a first RFIC 721, a second RFIC 722, a switching module 730, an antenna array 740, first and second front-end modules 751 and 753, and/or a diplexer 752.

The communication device 700 of FIG. 12A may have a structure similar to that of the communication device 600 described with reference to FIG. 5, except that the switching module 730 further includes a third switch 733. In describing the communication device 700, common descriptions with the communication device 600 of FIG. 5 may be omitted.

The switching module 730 may include first to third switches 731 to 733 (e.g., a first switch 731, a second switch 732 and a third switch 733). The first switch 731 may electrically connect the first antenna PRX_A and the first front-end module 751, or may electrically connect the second switch 732 and the first front-end module 751, depending on the state. The second switch 732 may connect the second antenna SRX to the first switch 731, to the diplexer 752, or to the third switch 733, depending on the state. In addition, the third switch 733 may electrically connect the third antenna PRX_B and the second front-end module 753, or may electrically connect the second switch 732 and the second front-end module 753, depending on the state.

FIG. 12A illustrates a first state in which the first switch 731 electrically connects the first antenna PRX_A and the first front-end module 751, the second switch electrically connects the second antenna SRX and the diplexer 752, and the third switch 733 electrically connects the third antenna PRX_B and the second front-end module 753. In the example of FIG. 12A, a transmission signal associated with the first network may be output through the first antenna PRX_A, and a transmission signal associated with the second network may be output through the third antenna PRX_B.

FIG. 12B illustrates a second state in which the first and second switches 731 and 732 electrically connect the first front-end module 751 and the second antenna SRX, and the third switch 733 electrically connects the third antenna PRX_B and the second front-end module 753. The processor 710 may control the switching module 730 to have a state as illustrated in FIG. 12B and output an SRS signal associated with the first network through the second antenna SRX.

FIG. 12C illustrates a third state in which the second and third switches 732 and 733 electrically connect the second front-end module 753 and the second antenna SRX, and the first switch 731 electrically connects the first antenna PRX_A and the first front-end module 751. The processor 710 may control the switching module 730 to have a state as illustrated in FIG. 12C and output an SRS signal associated with the second network through the second antenna SRX.

The processor 710 may transmit the SRS associated with the first network to the first base station through the first antenna PRX_A or the second antenna SRX by switching the state of the switching module 730. The first base station may estimate the channel state in consideration of the diversity effect based on the SRS received from the first antenna PRX_A and the second antenna SRX.

In addition, the processor 710 may transmit the SRS associated with the second network to the second base station through the second antenna SRX or the third antenna PRX_B by switching the state of the switching module 730. The second base station may estimate the channel state in consideration of the diversity effect based on the SRS received from the second antenna SRX and the third antenna PRX_B.

According to example embodiments of the present disclosure, the communication device 700 may control the connection of the transmission path or the reception path to the shared antenna based on the priority of the SRS and the reception signal when a timing at which the SRS for a network is to be output to a shared antenna, for example, the second antenna SRX, overlaps a timing at which a signal to another network is to be received.

According to example embodiments of the present disclosure, the communication device 700 may select the transmission path connected to the shared antenna according to a predetermined (or alternatively, given) rule when a timing when the SRS for a network is output to a shared antenna overlaps a timing when the SRS for another network is output.

Figure 13:
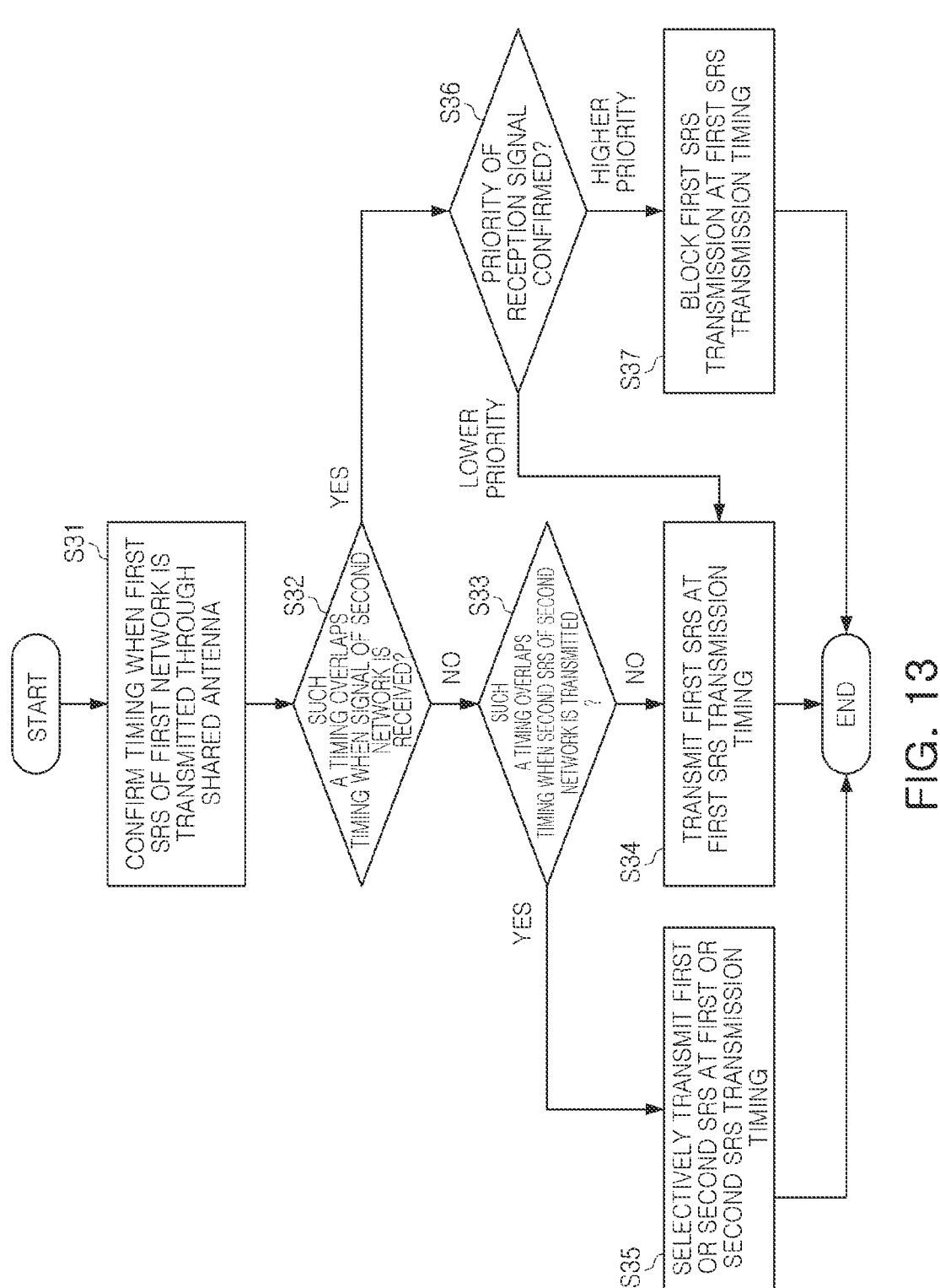
FIG. 13 is a flowchart illustrating a wireless communication method of a communication device according to example embodiments of the present disclosure.

FIG. 13 is a flowchart illustrating a wireless communication method of a communication device according to example embodiments of the present disclosure.

In operation S31, the communication device 700 may confirm a timing when the SRS for the first network will be transmitted through the shared antenna, for example, the second antenna SRX.

In operation S32, the communication device 700 may determine whether the timing when the SRS is transmitted for the first network overlaps a timing when a signal for the second network is received.

When the timing when the SRS (may also be referred to herein as a "first SRS") for the first network is transmitted does not overlap the timing when the signal for the second network is received ("No" in operation S32), in operation S33, the communication device 700 may determine (e.g., confirm) whether the timing when the first SRS for the first network is transmitted overlaps the timing when the SRS (may also be referred to herein as a "second SRS") for the second network is transmitted.

When the timing when the SRS for the first network is transmitted does not overlap the timing when the SRS for the second network is transmitted ("No" in operation S33), in operation S34, the communication device 700 may transmit the first SRS through the shared antenna at the time when the SRS for the first network is to be transmitted. A transmission signal for the second network may be transmitted through the third antenna PRX_B at the timing (e.g., contemporaneously).

When the time when the SRS for the first network is transmitted overlaps the timing when the SRS for the second network is transmitted ("Yes" in operation S33), in operation S35, the communication device 700 may selectively transmit the first SRS to the first network or the second SRS to the second network through the shared antenna.

For example, the SRS transmission for the first network and the SRS transmission for the second network may be performed at a period determined by the RRC reconfiguration. A case in which the timing when the SRS for the first network is transmitted overlaps the timing when the SRS for the second network is transmitted may occur periodically. Whenever the timings overlap each other, the communication device 700 may alternately transmit the SRS for the first network and the SRS for the second network (e.g., at consecutive timings).

When the timing when the SRS for the first network is transmitted overlaps the timing when the signal for the second network is received ("Yes" in operation S32), in operation S36, the communication device 700 may determine (e.g., confirm) the priority of the first SRS and the priority of the reception signal (e.g., confirm the priority of the reception signal with respect to the priority of the first SRS).

When the priority of the reception signal is higher than the priority of the first SRS ("higher priority" in operation S36), in operation S37, the communication device 700 may block the transmission path of the first SRS through the shared antenna at the timing when the first SRS is to be transmitted and receive the reception signal using the shared antenna. According to example embodiments, the communication device 700 may receive the signal for the second network through the shared antenna at the timing when the first SRS was to be transmitted, and may normally decode the received signal (e.g., alone or in combination with another signal received via the third antenna PRX_B to provide a diversity effect).

When the priority of the reception signal is lower than the priority of the first SRS ("lower priority" in operation S36), in operation S34, the communication device 700 may transmit the first SRS through the shared antenna at the timing when the first SRS is to be transmitted.

FIG. 13 illustrates and describes a case in which the communication device 700 determines whether the first SRS is transmitted by comparing the timing when the SRS associated with the first network is transmitted, with the timing when the signal for the second network is transmitted and received. Likewise, the communication device 700 may determine whether the SRS associated with the second network is transmitted by comparing the timing when the SRS associated with the second network is transmitted, with the timing when the signal (e.g., the SRS) for the first network is transmitted and/or received.

According to example embodiments of the present disclosure described with reference to FIGS. 12A to 13, the communication device 700 may transmit the SRS associated with the first network and the SRS associated with the second network using the shared antenna. Accordingly, the first base station included in the first network and the second base station included in the second network may estimate the diversity channel state of the communication device 700. Accordingly, the communication device 700 may reduce the number of antennas in the entire communication device 700 and improve communication performance using the shared antenna.

A tradeoff exists between a size of conventional communication devices and a quality of communication performance of the conventional communication devices. For example, conventional communication devices that enable contemporaneous communication with different networks by increasing a number of antennas therein provide improved communication performance but also have increased size and manufacturing costs. Conventional communication devices that enable sharing of antennas between contemporaneous network connections allow for fewer antennas, and a corresponding reduction in the size of the conventional communication devices and the =manufacturing costs thereof, but suffer a degradation in communication performance due to higher priority signals being missed when their reception via a shared antenna overlaps with transmission of an SRS signal of another network via the shared antenna.

However, example embodiments provide improved devices and methods for contemporaneous communication with different networks. For example, the improved devices and methods may determine whether a timing at which an SRS signal is to be transmitted to a first network via a shared antenna overlaps with a timing at which a signal is to be received from a second network via the shared antenna. If so, the improved devices and methods may determine whether the signal to be received from the second network is of a higher priority than the SRS signal. In the event the signal to be received from the second network is of a higher priority than the SRS signal, the improved devices and methods may block the transmission of the SRS signal such that the higher priority signal may be received from the second network. Accordingly, the improved devices and methods overcome the deficiencies of the conventional devices and methods to at least improve communication performance through a shared antenna while enabling a reduction in size and manufacturing costs of the improved devices.

According to example embodiments, operations described herein as being performed by the wireless communication system 1, the communication device 100, the first network 210, the first base station 211, the second network 220, the second base station 221, the processor 110, the first RFIC 121, the second RFIC 122, the switching module 130, the first SIM 111, the second SIM 112, the network environment 300, the first base station 311, the second base station 321, the network environment 400, the first base station 411, the second base station 421, the FEM 151, the diplexer 152, the protocol stack system 500, the hardware interface 510, the first protocol stack 521 (and/or the first layer L1, the second layer L2 and/or the third layer L3 of the first protocol stack 521), the second protocol stack 522 (and/or the first layer L1, the second layer L2 and/or the third layer L3 of the second protocol stack 522), the upper layer of the first protocol stack 521 and/or the second protocol stack 522, the communication device 600, the processor 610, the first RFIC 621, the second RFIC 622, the switching module 630, the first FEM 651, the second FEM 653, the diplexer 652, the communication device 700, the processor 710, the first RFIC 721, the second RFIC 722, the switching module 730, the first FEM 751, the second FEM 753 and/or the diplexer 752 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to example embodiments, the first switch 131, the second switch 132, the first switch 631, the second switch 632, the first switch 731, the second switch 732 and/or the third switch 733 may be implemented using one or more circuit elements (e.g., one or more transistors).

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

It will be understood that when an element is referred to as being "connected" or "coupled" to another element, it may be directly connected or coupled to the other element or intervening elements may be present. As used herein the term "and/or" includes any and all combinations of one or more of the associated listed items. Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

The present disclosure is not limited to the above-described examples and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

What is claimed is:

1. A communication device comprising:
a first antenna and a second antenna;
a first front-end module configured to provide a transmission path associated with a first network or a first reception path associated with the first network;
a diplexer electrically configured to provide a second reception path associated with the first network and a first reception path associated with a second network; and
processing circuitry configured to,
receive a message from the first network, the message including a first timing at which a first sounding reference signal (SRS) associated with the first network is to be transmitted through the first antenna and a second timing at which a second SRS associated with the first network is to be transmitted through the second antenna,
electrically connect the first front-end module to the first antenna in a first state,
electrically connect the diplexer to the second antenna in the first state,
electrically connect the first front-end module to the second antenna in a second state, and
electrically disconnect the diplexer from the second antenna in the second state.

2. The communication device of claim 1, wherein the processing circuitry is configured to determine whether to enter the first state based on a priority of a first signal to be received by the communication device at the second timing.

3. The communication device of claim 2, wherein the processing circuitry is configured to:
operate a first protocol stack for accessing the first network and a second protocol stack for accessing the second network, the first protocol stack and the second protocol stack sharing an upper layer.

4. The communication device of claim 3, wherein the processing circuitry is configured to:
compare signal communication timings of the first network and the second network by operating the upper layer;
determine whether the second timing overlaps a third timing when the first signal is to be received by the communication device; and
determine whether the priority of the first signal to be received is higher than a priority of the second SRS in response to determining that the second timing.

5. The communication device of claim 1, further comprising:
a first switch and a second switch,
wherein the processing circuitry is configured to,
control the first switch to electrically connect the first front-end module and the first antenna in the first state,
control the first switch to electrically connect the first front-end module and the second switch in the second state,
control the second switch to electrically connect the diplexer and the second antenna in the first state, and
control the second switch to electrically connect the first switch and the second antenna in the second state.

6. The communication device of claim 5, further comprising:
a third antenna; and
a second front-end module configured to provide a transmission path associated with the second network or a second reception path associated with the second network.

7. The communication device of claim 6, wherein the communication device further comprises:
a third switch,
wherein the processing circuitry is configured to,
control the third switch to electrically connect the second front-end module and the third antenna in the first state and the second state,
control the first switch to electrically connect the first front-end module and the first antenna in a third state,
control the second switch to electrically connect the third switch and the second antenna in the third state, and
control the third switch to electrically connect the second switch and the second front-end module in the third state.

8. The communication device of claim 7, wherein the first network and the second network each communicates with the communication device using a time division duplexing (TDD).

9. The communication device of claim 1, further comprising:
a first subscriber identity module (SIM) including information for accessing the first network; and a second SIM including information for accessing the second network.

10. The communication device of claim 1, wherein the processing circuitry is configured to communicate a message to or from a base station of the second network using the first network through multi-connectivity.

11. The communication device of claim 1, wherein the communication device communicates with the first network and the second network according to different radio access technologies (RATs).

12. A communication device comprising:
a dedicated antenna configured to transmit or receive a signal associated with a first network;
a shared antenna configured to receive the signal associated with the first network and a signal associated with a second network; and
processing circuitry configured to,
switch between a first transmission path for transmitting a first surrounding reference signal (SRS) associated with the first network and a second transmission path for transmitting a second SRS associated with the first network, the first transmission path transmitting the first SRS through the dedicated antenna, and the second transmission path transmitting the second SRS through the shared antenna,
receive a message from the first network, the message including a first timing at which the first SRS is to be transmitted through the first transmission path and a second timing at which the second SRS is to be transmitted through the second transmission path, and
block the second transmission path when a priority of the signal associated with the second network is higher than a priority of the second SRS, the signal associated with the second network to be received at the second timing.

13. A wireless communication method for contemporaneous connection to a first network and a second network, comprising:
receiving a message from the first network, the message including a first timing at which a first surrounding reference signal (SRS) is to be transmitted through a first antenna and a second timing at which a second SRS associated with the first network is to be transmitted through a shared antenna, the shared antenna being configured to receive a first signal associated with the first network and a second signal associated with the second network;
determining whether the second timing overlaps a third timing when the second signal is to be received;
determining whether a priority of the second signal is higher than a priority of the second SRS in response to determining that the second timing overlaps the third timing; and
blocking the second SRS from being transmitted at the second timing in response to determining that the priority of the second signal is higher than the priority of the second SRS.

14. The wireless communication method of claim 13, further comprising:
setting the second timing based on a radio resource control (RRC) reconfiguration message received from a base station.

15. The wireless communication method of claim 14, wherein the determining whether the second timing overlaps the third timing comprises:
determining a timing difference between a first frame of the first network and a second frame of the second network using a common clock;
determining whether the second network is in a downlink transmission period at the second timing based on resource allocation information of the second frame and the timing difference; and
determining that the second timing overlaps the third timing in response to determining that the second network is in the downlink transmission period at the second timing.

16. The wireless communication method of claim 13, further comprising:
transmitting the second SRS through the shared antenna at the second timing in response to determining that the priority of the second signal is lower than the priority of the second SRS.

17. The wireless communication method of claim 16, further comprising:
transmitting a retransmission request for the second signal to a base station based on the transmitting the second SRS.

18. The wireless communication method of claim 13, wherein the determining whether the priority of the second signal is higher than the priority of the second SRS comprises:
determining that the priority of the second signal is higher than the priority of the second SRS based on the second signal being a paging signal, a synchronization signal, or a reference signal for determining a channel decoding method.

19. The wireless communication method of claim 18, wherein the determining whether the priority of the second signal is higher than the priority of the second SRS further comprises:
determining that the priority of the second signal is lower than the priority of the second SRS based on the second signal being a data signal.

20. The wireless communication method of claim 13, further comprising:
determining whether the second timing overlaps a fourth timing when a third SRS associated with the second network is to be transmitted through the shared antenna; and
alternately transmitting the second SRS and the third SRS through the shared antenna in response to determining that the second timing overlaps the fourth timing.

* * * * *